US012769701B2

(12) United States Patent
Petrini et al.

(10) Patent No.: US 12,769,701 B2
(45) Date of Patent: Oct. 20, 2026

(54) IN-NETWORK PARALLEL PREFIX SCAN

(71) Applicant: Intel Corporation, Santa Clara, CA (US)

(72) Inventors: Fabrizio Petrini, Menlo Park, CA (US); Kartik Lakhotia, Los Angeles, CA (US)

(73) Assignee: Intel Corporation, Santa Clara, CA (US)

(*) Notice: Subject to any disclaimer, the term of this patent is extended or adjusted under 35 U.S.C. 154(b) by 462 days.

(21) Appl. No.: 17/469,644

(22) Filed: Sep. 8, 2021

(65) Prior Publication Data

US 2021/0406214 A1 Dec. 30, 2021

(51) Int. Cl.
*G06F 15/173* (2006.01)
*G06F 7/544* (2006.01)

(52) U.S. Cl.
CPC ........ *G06F 15/17306* (2013.01); *G06F 7/544* (2013.01)

(58) Field of Classification Search
CPC ........................... G06F 15/17306; G06F 7/544
See application file for complete search history.

(56) References Cited

U.S. PATENT DOCUMENTS 6,542,918 B1 4/2003 Vishkin
8,171,047 B2 * 5/2012 Barsness ........... G06F 16/24532 707/966
9,396,512 B2 7/2016 Karras
11,425,195 B1 * 8/2022 Matthews .............. G06N 3/063
11,488,935 B1 * 11/2022 Zaman ................ H01L 25/0655
2019/0146961 A1 5/2019 Finis et al.
2021/0149683 A1 5/2021 More et al.

FOREIGN PATENT DOCUMENTS

CN 111966678 A 11/2020

OTHER PUBLICATIONS

Sanders, Peter et al. "Parallel Prefix (Scan) Algorithms for MPI." Lecture Notes in Computer Science. Berlin, Heidelberg: Springer Berlin Heidelberg,. 49-57. (Year: 2006).*

(Continued)

*Primary Examiner* — Andrew Caldwell
*Assistant Examiner* — Kenny K. Bui
(74) *Attorney, Agent, or Firm* — Compass IP Law PC

(57) ABSTRACT

Methods and apparatus for in-network parallel prefix scan. In one aspect, a dual binary tree topology is embedded in a network to compute prefix scan calculations as data packets traverse the binary tree topology. The dual binary tree topology includes up and down aggregation trees. Input values for a prefix scan are provided at leaves of the up tree. Prefix scan operations such as sum, multiplication, max, etc. are performed at aggregation nodes within the up tree as packets containing associated data propagate from the leaves to the root of the up tree. Output from aggregation nodes in the up tree are provide as input to aggregation nodes in the down tree. In the down tree, the packets containing associated data propagate from the root to its leaves. Output values for the prefix scan are provided at the leaves of the down tree.

18 Claims, 11 Drawing Sheets

(56) References Cited

OTHER PUBLICATIONS

Zaib, Muhammad Aurang. "Network on Chip Interface for Scalable Distributed Shared Memory Architectures", Technische Universität München (Year: 2018).*

Peter Sanders, Jochen Speck, Jesper Larsson Traff, "Two-tree algorithms for full bandwidth broadcast, reduction and scan", Parallel Computing, vol. 35, Issue 12, pp. 581-594, ISSN 0167-8191, https://doi.org/10.1016/j.parco.2009.09.001. (Year: 2009).*

International Search Report and Written Opinion for PCT Patent Application No. PCT/US22/34594, Mailed Sep. 30, 2022, 12 pages.

* cited by examiner

IN-NETWORK PARALLEL PREFIX SCAN

GOVERNMENT INTEREST STATEMENT

This invention was made with Government support under Agreement No. HR0011-17-3-0004, awarded by DARPA. The Government has certain rights in the invention.

BACKGROUND INFORMATION

Prefix scan is a basic primitive widely used in several parallel computing applications such as sorting, string comparison, array packing, solving linear systems, load balancing etc. A low latency and high throughput prefix scan implementation is important to scaling performance of such applications.

Typical implementations of prefix scan utilize multiple rounds of software-controlled computation and communication between the nodes. A pipelined software algorithm uses two passes over a binary tree, where each node executes one step of both passes in every round. However, this approach incurs high latency owing to overheads of data transfer from network to software memory. Further, compute resources on the nodes are reserved for calculating aggregations in prefix and coordinating inter-node messages. This can reduce the efficiency and scalability of the underlying application, especially for a system software or applications that use prefix scan frequently, such as radix sort.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
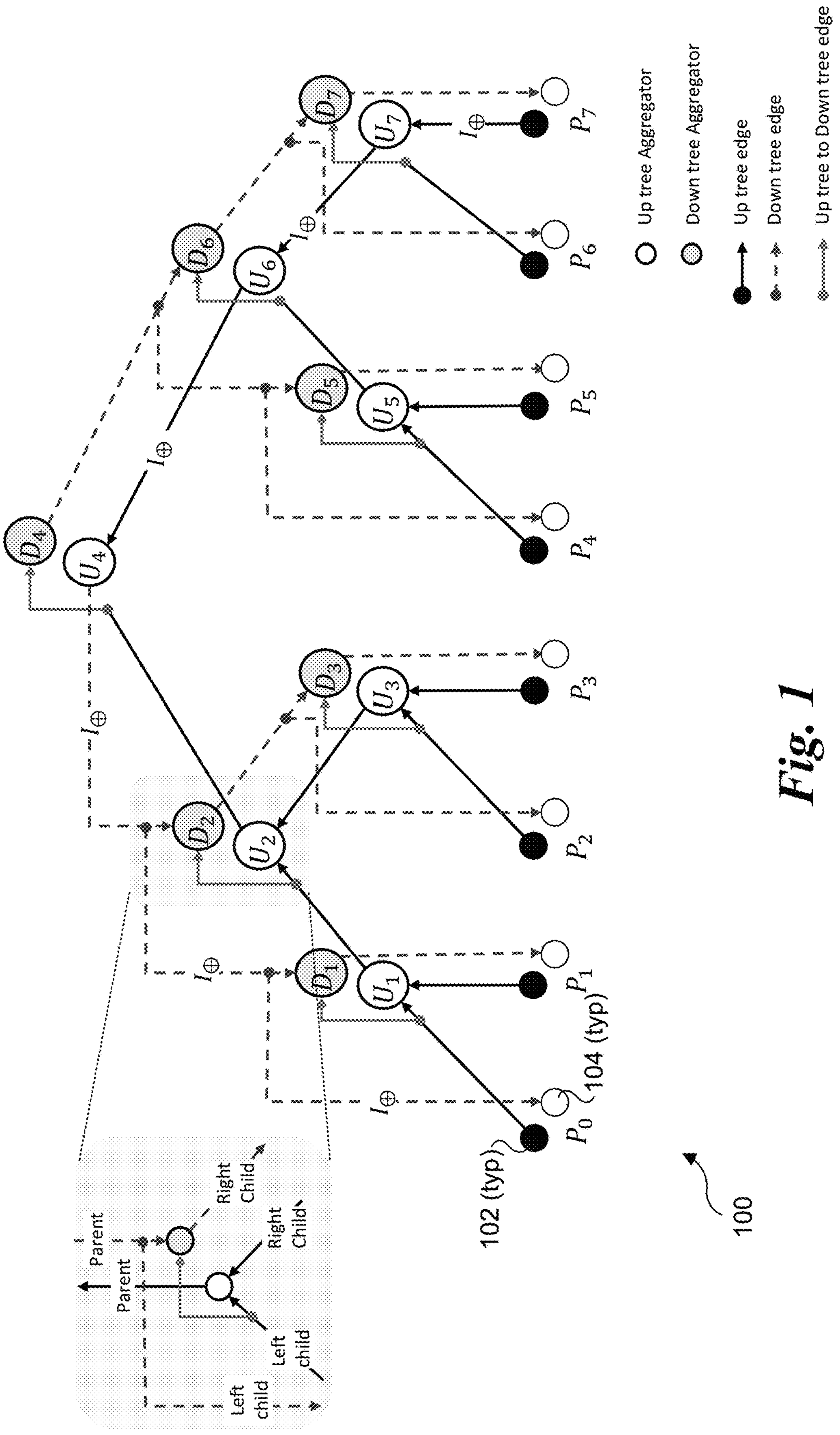
FIG. 1 is a schematic diagram illustrating an exemplary embodiment of the dual binary tree topology for prefix scan computation.

Embodiments of methods and apparatus for in-network parallel prefix scan are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to “one embodiment” or “an embodiment” means that a particular feature, structure, or characteristic described in connection with the embodiment is included in at least one embodiment of the present invention. Thus, the appearances of the phrases “in one embodiment” or “in an embodiment” in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by “(typ)” meaning “typical.” It will be understood that the configuration of these components will be typical of similar components that may exist but are not shown in the drawing Figures for simplicity and clarity or otherwise similar components that are not labeled with separate reference numbers. Conversely, “(typ)” is not to be construed as meaning the component, element, etc. is typically used for its disclosed function, implement, purpose, etc.

In accordance with aspects of the embodiments disclosed herein, a dual binary tree topology to compute prefix scans in-network is provided that leverages switches to perform aggregation operations on data contained in data packets as they move through the network. By embedding the topology on a network, prefix computation can be completely offloaded to the network with a single transfer of values from process memory to the network and vice-versa (to obtain the results of the prefix scan calculation). This drastically reduces synchronization, accelerates prefix scan calculation, and enables computation-communication overlap.

The proposed topology may be embedded in a physical network, and can be scaled to large multi-dimensional networks such as PIUMA (Programmable Integrated Unified Memory Architecture). The embodiments exhibit a latency logarithmic in the number of participating processes and can compute multiple element-wise prefix scans in a pipelined manner when each die/process contributes a vector of elements. This disclosure also describes the performance bottlenecks of the topology and an embedding recommendation to generate a high throughput prefix scan pipeline.

The basic principle is to use two binary trees in a feed-forward topology to implement an exclusive prefix scan computation pipeline in the network. The formulation of the exclusive prefix scan is given as follows:

$$y_0 = I_{\oplus}$$

$$y_1 = x_0$$

-continued $$y_2 = x_0 \oplus x_1$$

$$y_l = x_0 \oplus x_1 \ \ldots \ \oplus x_{l-1}$$

where $y_i$ and $x_i$ are the output and input of the $i^{th}$ process respectively, $\oplus$ is the operation to be performed (e.g., sum, multiplication, max, etc.), and $I_\oplus$ is the identity value of $\oplus$ (e.g., 0 for sum, 1 for multiplication, etc.). Note that the exclusive scan is more generic because it can be easily converted to inclusive scan (by computing $y_i \oplus x_i$ at $i^{th}$ process) whereas vice-versa may not be possible for some operators $\oplus$ such as max.

The processes insert input values $x_i$ on the leaves of one of the trees (called the up tree) and receive the outputs $y_i$ on the leaves of the other tree (called the down tree). Nodes at intermediate levels acquire their values by aggregating data in in-flight packets only, and do not require any initialization or interaction with the process memory.

In further detail, two binary aggregation trees in a feed-forward topology are implemented such that leaves of one tree represent the input array values inserted in the network and leaves of the second tree represent the output prefix scan values. The output is computed on-the-fly as the data is routed through the tree edges, with calculations being made using collective engines in the switches. Thus, prefix scan computation can be completely offloaded to the network by mapping (i) leaves of both the trees to the process memory and network interface and (ii) aggregator nodes in the trees to network switches.

FIG. 1 shows an exemplary embodiment of a dual binary tree topology 100 for prefix scan computation. We denote the tree that takes input from process memory as the up tree and the tree that outputs prefix scan results (values) to process memory as the down tree. As illustrated, the nodes in the up tree are labeled $U_1$, $U_2$, . . . $U_7$, while the nodes in the down tree are labeled $D_1$, $D_2$, . . . $D_7$. Inputs to the down tree are the partial sums generated by up tree aggregators (up tree to down tree edges in FIG. 1).

Input is injected on leaf nodes 102 of the up tree when a process (one of $P_0$, $P_1$, . . . $P_7$) calls the instruction corresponding to prefix scan in the instruction set architecture (ISA) of a core (or other type of compute unit). Values received on leaves 104 of down trees are deposited back into the process memory. The proposed topology also allows pipelined computation of multiple prefix scans over an array of values per process. When element-wise prefix on an array is computed, the calling process specifies the location of the array in the local memory along with the number of elements in the array. The collective engine will insert these values into the network one by one. It will also count the number of values outputted to the calling process and indicate completion when number of values outputted become equal to number of input values ingested in the network.

Figure 2:
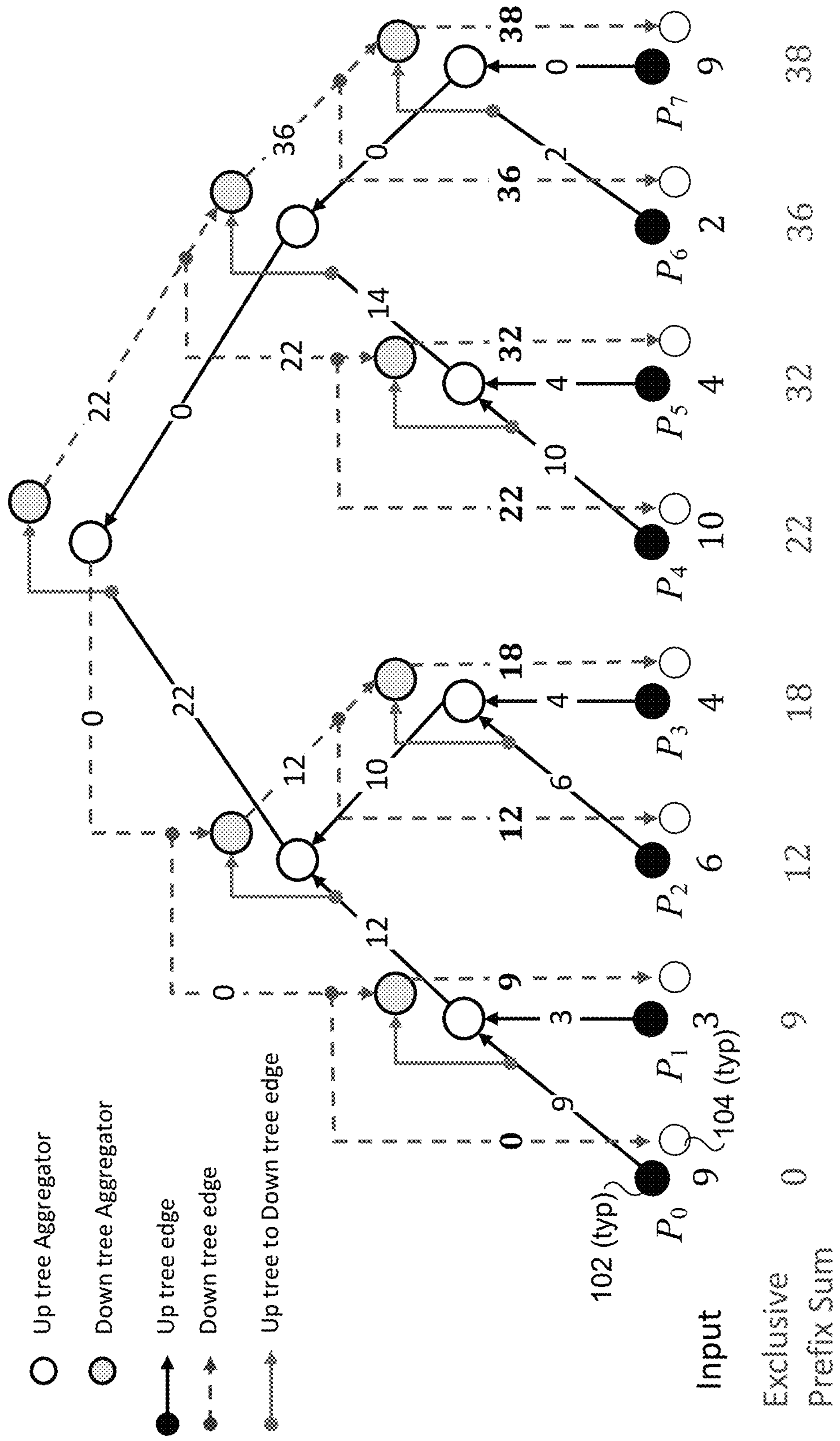
FIG. 2 is a schematic diagram illustrating further detail of the dual binary tree topology of FIG. 1 including a prefix scan input and output.

FIG. 2 illustrates an example of how computation proceeds for a prefix sum (aggregators add the input values) in the proposed topology. In the up tree, the data propagates from input leaves 102 towards the root and is aggregated at the nodes. In the down tree, data packets move from the root towards output leaves 104. A node v in the down tree receives two inputs:

1. Partial sum of all values in the left subtree of the parent of v.
2. Partial sum of all values in the left subtree of v. Note that this value is computed and forwarded by the left child of v in the up tree.

Note that the rightmost process $P_7$ inserts 0 into the tree even though the input value is 9. This is because as per the formulation of exclusive scan, the value of the last process ($P_7$ in this example) is not included in the output at any other process. Moreover, the output of exclusive prefix scan to the first process ($P_0$ in this example) is the identity element under $\oplus$ (which is 0 for addition). Therefore, the aggregators on the rightmost arm of the up tree pass the 0 value unchanged to the root vertex, which further passes it to the down tree. This also eliminates the need to initialize the root of the down tree with the identity element. Existing software implementations use root process to perform such initialization, which is not feasible in an in-network computing scenario.

PIUMA Architecture

Figure 3:
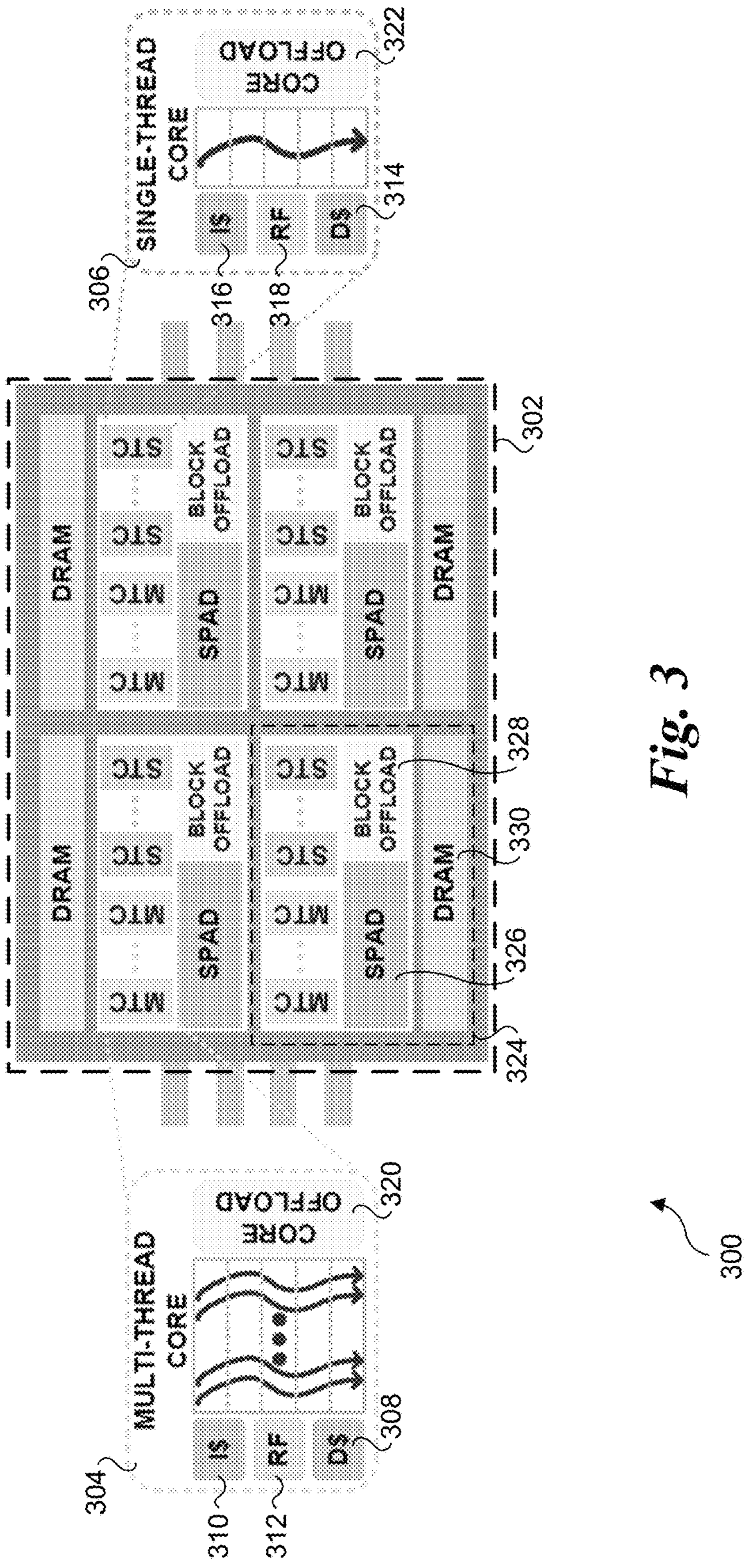
FIG. 3 is a schematic diagram of illustrating a core tile for a PIUMA architecture, according to one embodiment.

In some embodiments, distributed compute components are used to perform graph processes, such as illustrated in FIG. 1. One non-limiting example of such an architecture employing distributed compute components is PIUMA. A diagram 300 illustrating a core tile for a PIUMA architecture is shown in FIG. 3. The design of PIUMA cores builds on the observations that most graph workloads have abundant parallelism, are memory bound and are not compute intensive. These observations call for many simple pipelines, with multi-threading to hide memory latency.

At a physical component level, the smallest unit in the PIUMA architecture is a PIUMA die, which is integrated as a System on a Chip (SoC), also referred to as a PIUMA chip or PIUMA socket. As explained an illustrated below, a PIUMA die/socket includes multiple core tiles and switch tiles. In the illustrated embodiment, a core in a PIUMA core tile 302 has two types of cores including multi-thread cores (MTCs) 304 and single-thread cores (STCs) 306.

MTCs 304 comprise round-robin multi-threaded in-order pipelines. At any moment, a thread can only have one in-flight instruction, which considerably simplifies the core design for better energy efficiency. STCs 306 are used for single-thread performance sensitive tasks, such as memory and thread management threads (e.g., from the operating system). These are in-order stall-on-use cores that are able to exploit some instruction and memory-level parallelism, while avoiding the high-power consumption of aggressive out-of-order pipelines. In one embodiment, both core types implement the same custom RISC instruction set.

A MTC and STC has a small data and instruction cache (D$ and I$), and a register file (RF) to support its thread count. For multi-thread core 304 this includes a data cache (D$) 308, an instruction cache (I$) 310, a register file 312. For single-thread core 306 this includes a D$ 314, an I$ 316, and a register file 318. A multi-thread core 304 also includes a core offload engine 320, while a single-thread core 306 includes a core offload 322.

Because of the low locality in graph workloads, no higher cache levels are included, avoiding useless chip area and power consumption of large caches. In one embodiment, for scalability, caches are not coherent across the whole system. It is the responsibility of the programmer to avoid modifying shared data that is cached, or to flush caches if required for correctness. MTCs 304 and STCs 306 are grouped into Cores 324 (also called blocks), each of which has a large local scratchpad (SPAD) 326 for low latency storage, a block offload engine 328, and local memory (e.g., some form of Dynamic Random Access Memory (DRAM) 330). Programmers are responsible for selecting which memory accesses to cache (e.g., local stack), which to put on SPAD (e.g., often reused data structures or the result of a DMA gather operation) and which not to store locally. There are no prefetchers to avoid useless data fetches and to limit power consumption. Instead, block offload engines 328 can be used to efficiently fetch large chunks of useful data.

Although the MTCs hide some of the memory latency by supporting multiple concurrent threads, their in-order design limits the number of outstanding memory accesses to one per thread. To increase memory-level parallelism and to free more compute cycles to the cores, a memory offload engine (block offload engine 328) is added to a Core 324. The block offload engine performs memory operations typically found in many graph applications in the background, while the cores continue with their computations. The direct memory access (DMA) engine in block offload engine 328 performs operations such as (strided) copy, scatter and gather. Queue engines are responsible for maintaining queues allocated in shared memory, alleviating the core from atomic inserts and removals. They can be used for work stealing algorithms and dynamically partitioning the workload. Collective engines implement efficient system-wide reductions and barriers. Remote atomics perform atomic operations at the memory controller where the data is located, instead of burdening the pipeline with first locking the data, moving the data to the core, updating it, writing back and unlocking. They enable efficient and scalable synchronization, which is indispensable for the high thread count in PIUMA.

The engines are directed by the PIUMA cores using specific PIUMA instructions. These instructions are non-blocking, enabling the cores to perform other work while the operation is done in the background. Custom polling and waiting instructions are used to synchronize the threads and offloaded.

Figure 4:
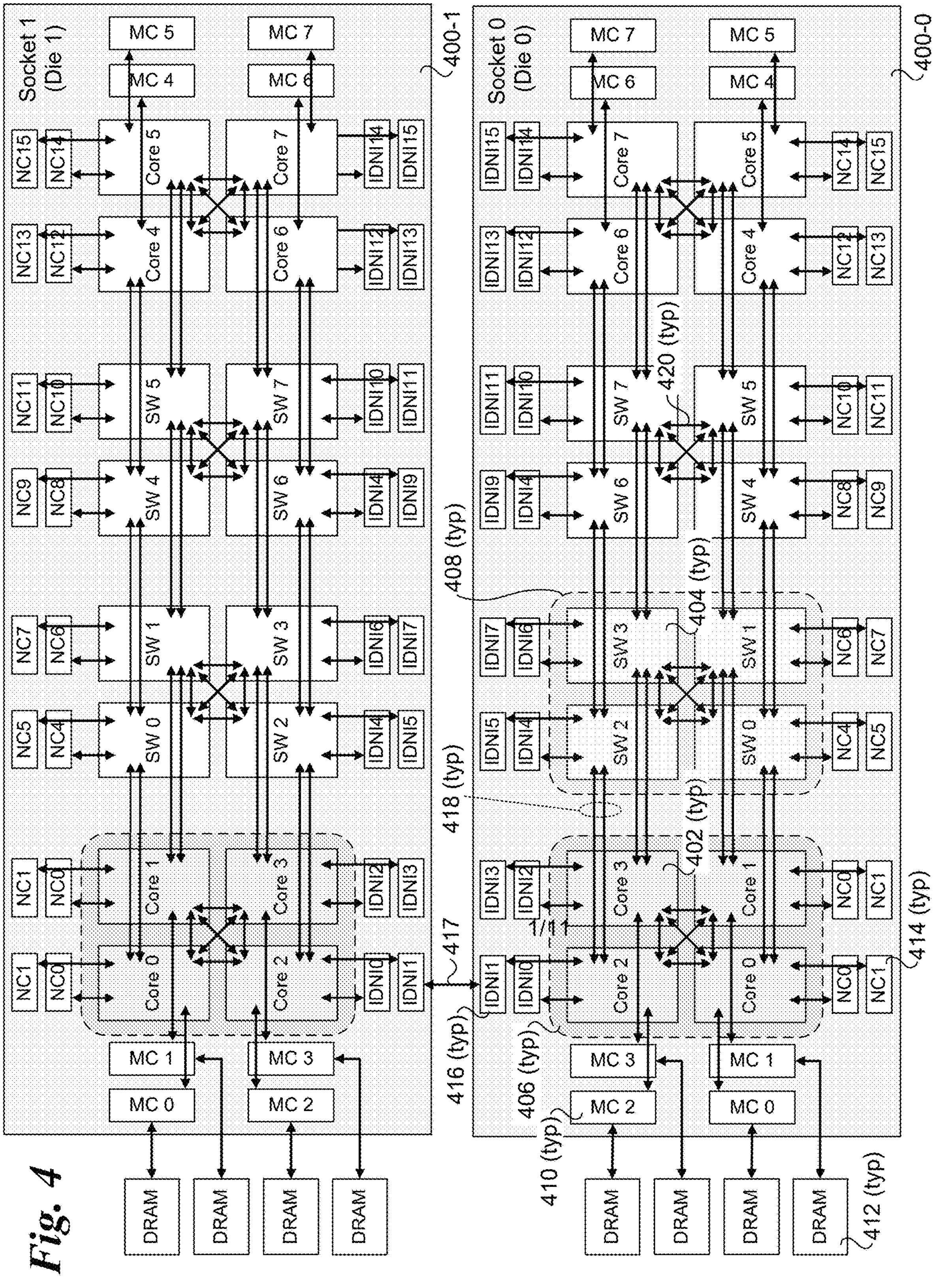
FIG. 4 is a schematic diagram illustrating a pair of sockets or dies in the PIUMA architecture, according to one embodiment.

FIG. 4 shows further details of the architecture of a PIUMA die/socket, according to one embodiment. FIG. 4 shows a pair of sockets 400-0 and 400-1. Generally, a PIUMA die/socket comprises a plurality of cores 402 and switches 404 arranged on core tiles 406 and switch tiles 408. In the illustrated embodiment, sockets 400-0 and 400-1 comprise two core tiles 406 having four cores 402, and two switch tiles 408 having four switches 404 each. In another embodiment, a PIUMA die/socket comprises four switch tiles comprising 16 switches.

A core 402 is connected to a respective memory controller (MC) 410, which in turn is connected to process memory comprising DRAM 412. As illustrated for socket 400-0, Each of the lower pair of cores in a core tile or lower pair of switches in a switch tile are connected to a pair of network controllers (NC) 414, while each of the upper pair of cores in a core tile or switches in a switch tile are connected to a pair of inter-die network interfaces (IDNI) 416 via an interconnect 417.

A pair of bidirectional links 418 connect each switch 404 of a tile T to corresponding core or switch (as applicable) in the tile towards the left or right of T. A switch in a switch tile 408 is interconnected with the other switches in the switch tile via bidirectional links 420.

PIUMA switches are configured to perform in-flight packet reduction (reduction on both packets and data contained in the packets) and include configurable routing capabilities that allow collective topologies to be embedded into the network. Their flow control mechanism further enables pipelined computation over numerous single element packets for high throughput vector collectives.

Collective packets in a PIUMA network are routed on an exclusive virtual channel. The scheduling mechanism in PIUMA switches prioritizes packets on a collective virtual channel. Hence, performance of in-network collectives is unaffected by the rest of the network traffic.

An input port of the switch has a FIFO buffer associated with the collective virtual channel for transient storage of the data packets. For an in-network prefix scan, these buffers constitute the network memory available for storage of partial sums.

A PIUMA switch has configuration registers that specify the connectivity between input-output (IO) ports for the collective virtual channel. As a given port is connected to a fixed neighboring switch, configuration registers effectively provide a low-level control over the routing paths in a network embedding.

Additionally, a switch consists of a Collective Engine (CENG) that can reduce in-flight packets on multiple input ports. Configuration registers of the switch also specify the input ports participating in reduction by the CENG, and the output port where the reduction result is forwarded. Embedding prefix scan into a PIUMA network can therefore be reduced to the problem of setting the switch configurations such that routing and reduction patterns in the network emulate a logical topology of the prefix scan. The CENG can also perform the applicable $\oplus$ operations (e.g., sum, multiplication, max, etc.) used for calculating the prefix scans in-network, wherein the calculations are completely offloaded from the cores or other types of compute units coupled to the network.

Figure 5:
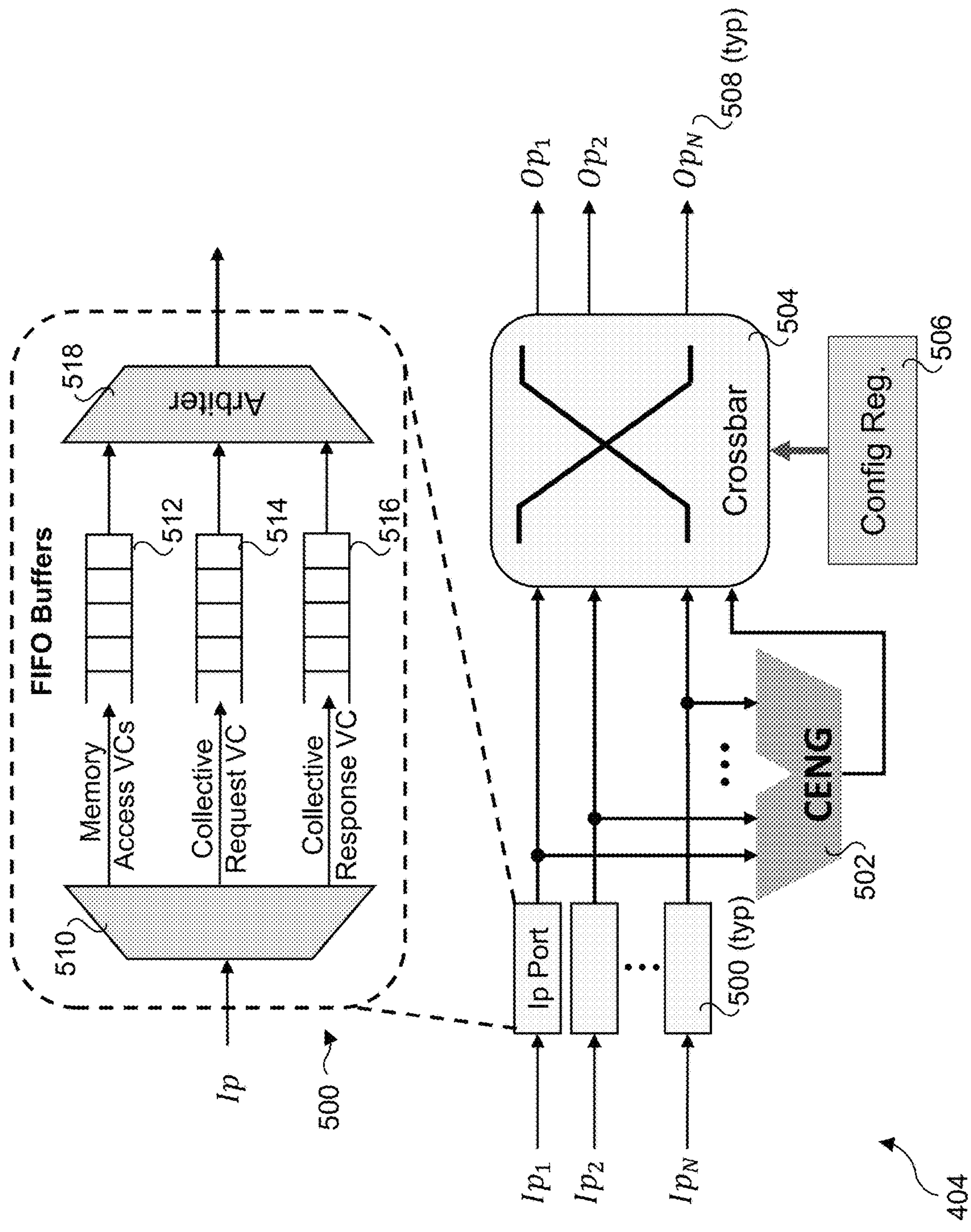
FIG. 5 is a schematic diagram of a switch, according to one embodiment.

FIG. 5 shows an internal architecture of a switch 404, according to one embodiment. Switch 404 includes N input ports 500 (also depicted as $Ip_1$, $Ip_2$ . . . $Ip_N$), a CENG 502, a crossbar 504, a configuration register 506, and a N output ports 508 ($Op_1$, $Op_2$ . . . $Op_N$). An input port 500 includes a multiplexer 510 having three outputs coupled to FIFO (First-in First-out) buffers 512, 514, and 516. Memory accesses are input via a memory access virtual channel (VC) to FIFO buffer 512. Collective requests are input via a collective request VC to FIFO 514, while collective responses are input via a collective request VC to FIFO 516. Outputs of FIFO buffers 512, 514, and 516 are provided as inputs to an arbiter 518.

Figure 6:
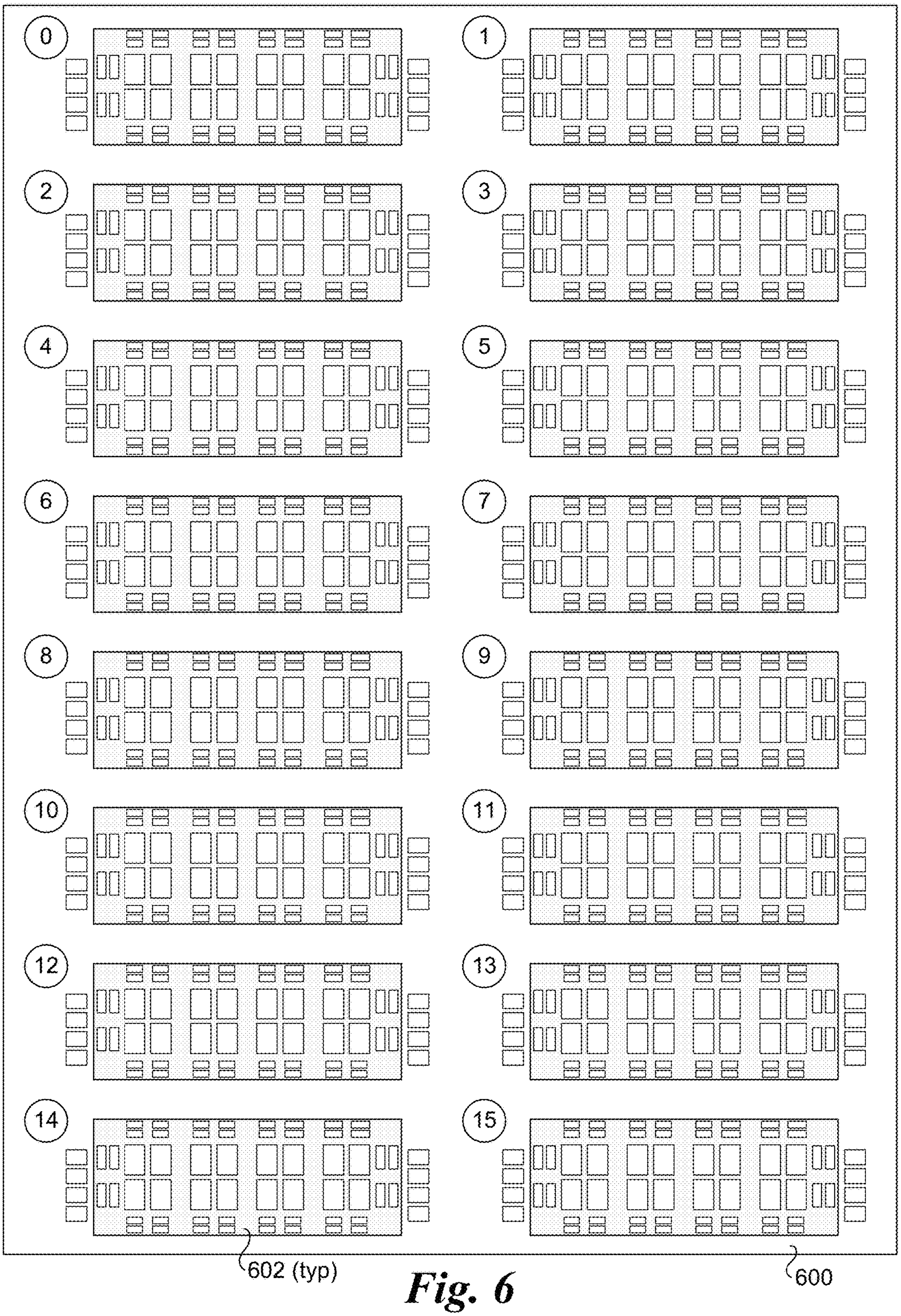
FIG. 6 is a schematic diagram of a PIUMA subnode, according to one embodiment.

FIG. 6 shows a high-level view of a PIUMA subnode 600, according to one embodiment. PIUMA subnode 600 includes 16 dies or sockets 602. The 16 dies or sockets are interconnected using inter-die or inter-socket links such that a die or socket is coupled directly or indirectly the other dies or sockets. Under one embodiment of a PIUMA node, the number of dies or sockets is 32. Both the values of 16 dies/sockets for a PIUMA subnode and 32 dies or sockets for a PIUMA node are merely exemplary and non-limiting.

The terms dies and sockets are generally used interchangeably herein. A PIUMA subnode or node may comprise multiple integrated circuit dies that are arranged on a substrate and interconnected via "wiring" formed in the substrate. A PIUMA socket may generally comprise an integrated circuit (IC) chip that is a separate component (or otherwise a separate "package"). For a PIUMA subnode or node comprised of PIUMA sockets, the sockets may be mounted to a printed circuit board (PCB) or the like, or may be configured using various other types of packaging such as using a multi-chip module or a multi-package module.

Embedding the Dual Binary Tree into a Physical Network

The proposed topology is suitable for in-network computation due to uniform resource distribution. In one embodiment, one aggregator from the up and down trees is associated with a respective process (e.g., aggregators in highlighted region of FIG. 1 are associated with process $P_2$). Such combination of two aggregators is denoted as a vertex of the dual binary tree. The one-to-one association between vertexes to processes supports embedding the topology on architectures where network switches are coupled with compute units (on which a process runs). For instance, consider a PIUMA subnode or node where process $P_i$ runs on Die i, the highlighted aggregators of the vertex associated with $P_2$ in FIG. 1 can be mapped to network switches on Die 2. Furthermore, edges of the up and down trees run in opposite directions between the same vertices. Hence, they can be easily mapped to bidirectional links in the network.

Figure 7:
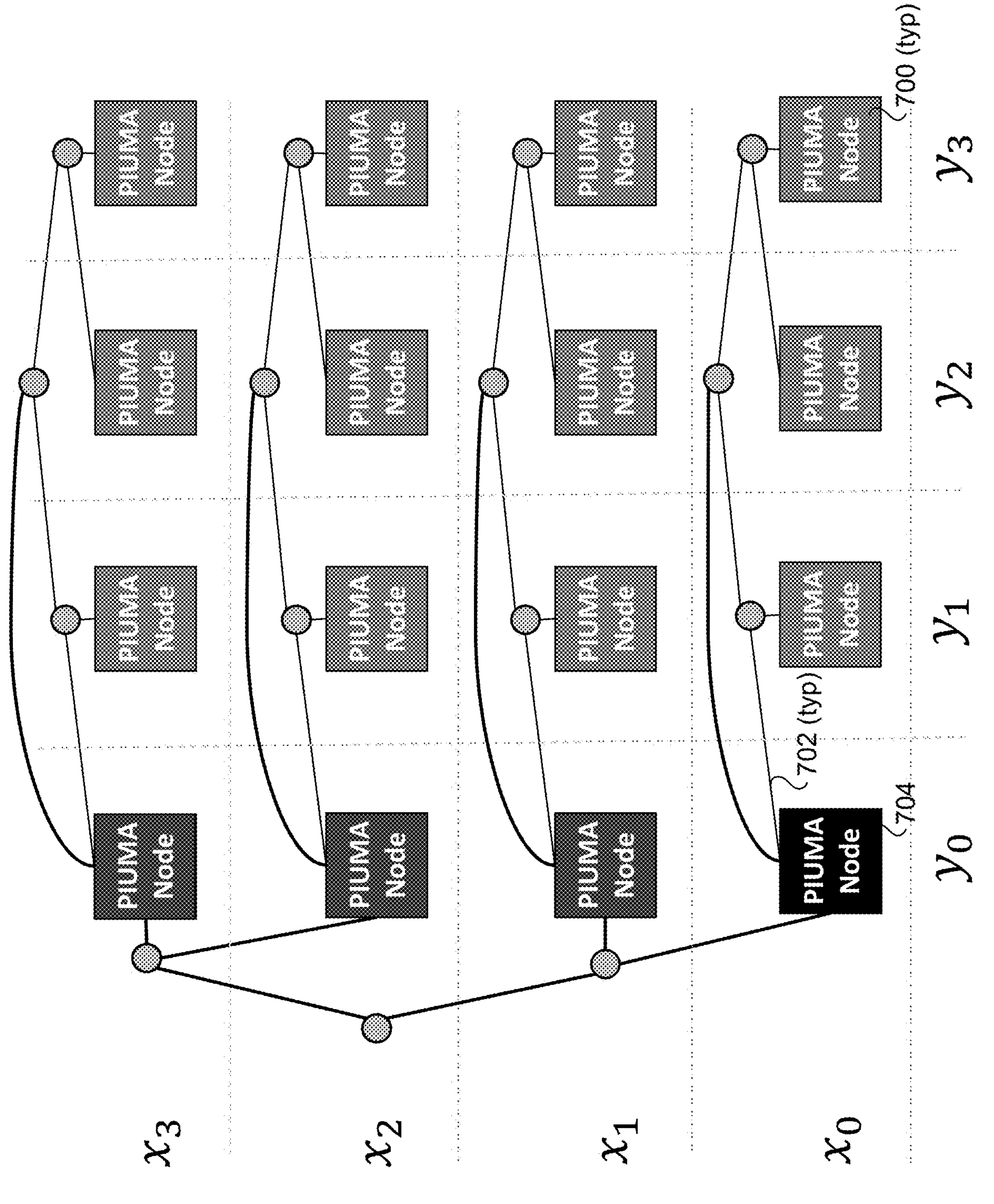
FIG. 7 is a diagram of a PIUMA system including an array of PIUMA nodes or subnodes.

The proposed topology is also highly scalable. Note that no vertices are associated to $P_0$ in FIG. 1. Thus, larger trees can be easily built using the 8-input unit shown in FIG. 1, by mapping new vertices to $P_0$ of such a unit. This enables scaling the computation to large multi-dimensional networks. For instance, FIG. 7 shows a mapping of the vertices to a 2-dimensional PIUMA system with 16 subnodes 700 arranged in an xy grid with rows $x_0$, $x_1$, $x_2$ and $x_3$ and columns $y_0$, $y_1$, $y_2$ and $y_3$ and interconnected via links 702. The horizontal (x) and vertical (y) directions represent the first and the second dimension, respectively. The prefix tree in vertical dimension is built on the $0^{th}$ subnode of all four trees in the horizontal dimension. The embedding can be scaled to a third dimension by using the black subnode 704 at the left-bottom for the tree in the third dimension, while leaving the rest of the embedding unchanged.

Figure 8:
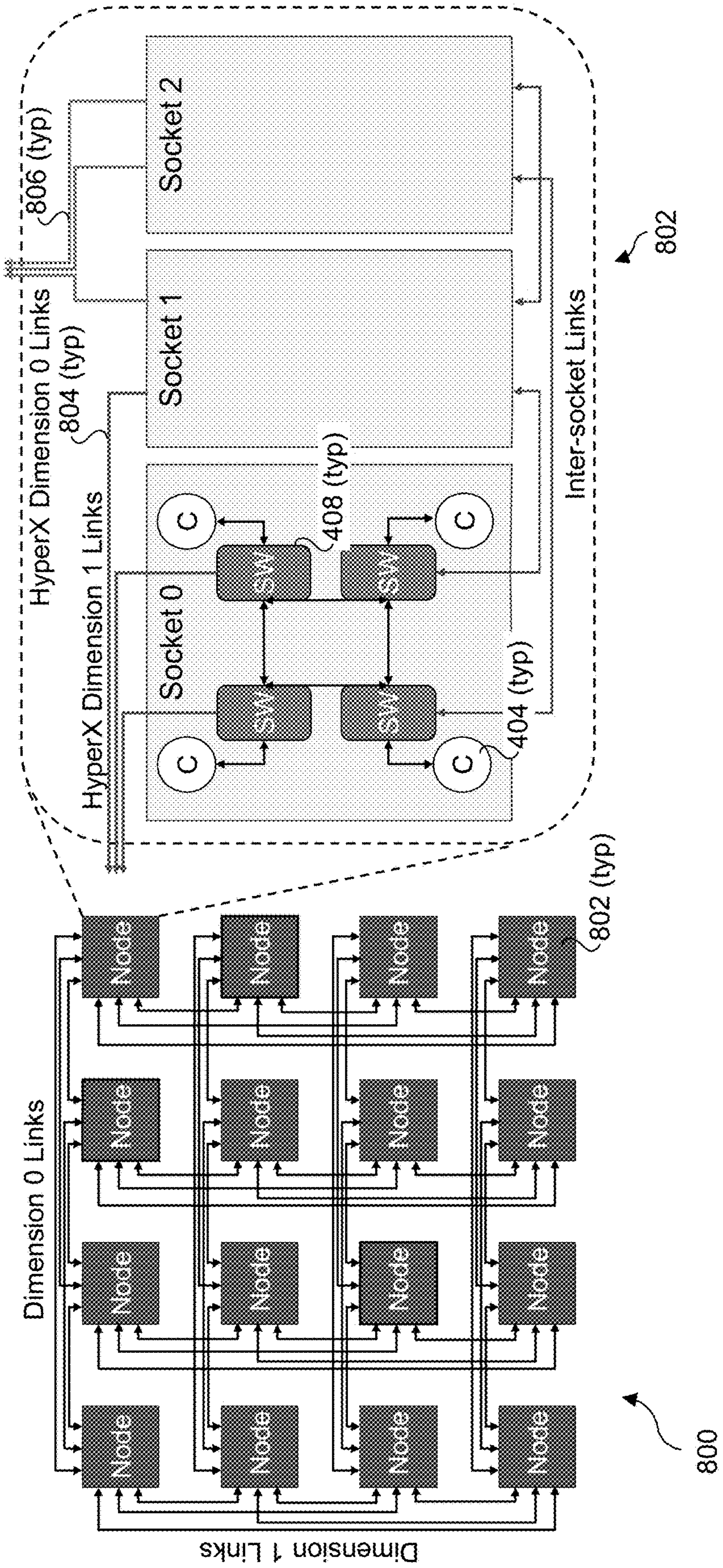
FIG. 8 is a diagram of a PIUMA system illustrating details of selected interconnects.

FIG. 8 shows a distributed environment 800 comprising 16 PIUMA nodes or subnodes 802 interconnected by a plurality of links. In a 2D array of PIUMA nodes or subnodes, the links comprise Dimension 0 links that interconnect nodes or subnodes on a row-wise basis and Dimension 1 links that interconnect nodes or subnodes on a column-wise basis. The right side of FIG. 8 shows another view of a PIUMA node or subnode 802, which comprises a plurality of sockets 804 interconnected by inter-socket links. As describe and illustrated above, a socket comprises a plurality of core tiles 404 and switch tiles 408. The network interfaces in the switches in the switch tiles are used to interconnect nodes or subnodes, as depicted by HyperX Dimension 1 links 804 and HyperX Dimension 0 links 806.

PIUMA implements a distributed global address space with a HyperX topology connecting the nodes, and an on-chip mesh for connectivity within a node as shown in FIG. 8. Memory within a node is divided into several blocks, each of which is connected to a respective core. Each switch is also connected with a core and has direct access to its local memory block for low-latency remote memory accesses. For in-network collectives, this allows switches to stream data packets between memory and network without core intervention (complete network offload). For example, this enables switches to place the output values of the down-tree leaf nodes directly into process memory without involving any core. Moreover, for a vector prefix scan, switches also keep track of how many elements they are placing in the memory. When the count reaches the desired number, they notify the core that the collective operation is completed.

The ports on these switches provide connectivity at different levels of the network hierarchy. In one embodiment, sockets within a node and peer nodes in any dimension of the HyperX are all-to-all connected. These dense connectivity patterns substantially simplify embedding of prefix scan. The hierarchical design also allows low-latency optical interconnections for long distance links between sockets and nodes.

For functional correctness, an embedding should guarantee deadlock free operation. Embedding the proposed topology on a physical system employs a simple deadlock avoidance mechanism. Deadlocks occur when there are cycles in the dependency graph of aggregators. Dependencies can be fundamental to the logical topology or can arise as a characteristic of the mapping. Given a vertex v and its parent $v_p$ in the dual-binary tree topology, the following fundamental dependencies can be seen in FIG. 1:

1. Up tree aggregator of $v_p$ is dependent on up tree aggregator of v.
2. Down tree aggregator of v is dependent on down tree aggregator of $v_p$.

In a compute capable network, a switch is used for both data aggregation and forwarding. Typically, the input packet on a switch is consumed if all output ports for that packet (including the aggregator if used) are ready to forward or operate upon the input data. This can create additional embedding induced dependencies between two aggregators.

Figure 9:
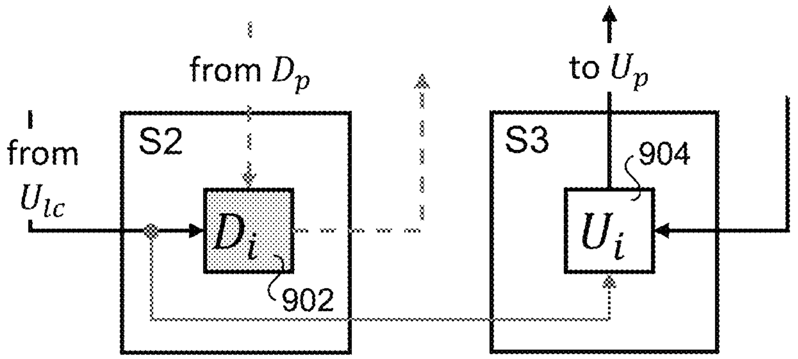
FIG. 9 is a diagram illustrating a pair of up and down tree aggregators implemented in adjacent switches.
Figure 10:
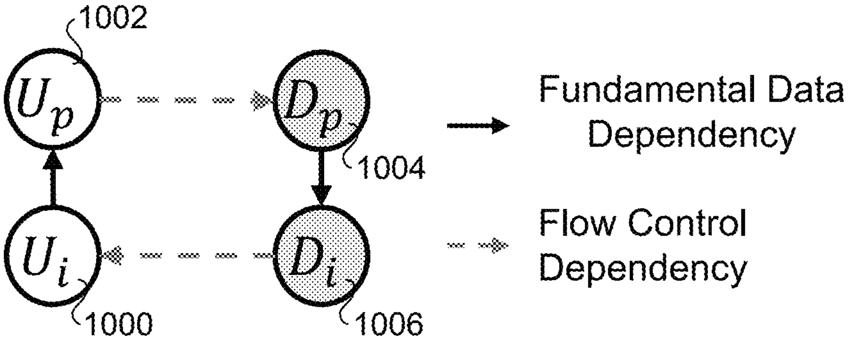
FIG. 10 is a diagram illustrating a deadlock situation that may result with the architecture shown in FIG. 9

The flow control rules for multicasting can induce dependencies that when combined with fundamental data dependencies in the topology, may cause deadlocks. For example, consider the embedding shown in FIG. 9, where reductions $D_i$ 902 and $U_i$ 904 are mapped to two switches S2 and S3 such that the switch containing $D_i$ lies on the embedded path from left child $U_{lc}$ to $U_i$. If $U_i$ and $D_i$ are right children of $U_p$ and $D_p$ respectively, a packet from $U_{lc}$ cannot reach $U_i$ until it can also be reduced at $D_i$ with the partial sum from $D_p$. Thus, $U_i$ has an embedding-induced dependency on $D_i$. If $D_p$ incurs a similar embedding-induced dependency on $U_p$, the resulting dependency graph will have a cycle ($U_i$ 1000, $U_p$ 1002, $D_p$ 1004, and $D_i$ 1006), as shown in FIG. 10.

The output packets from left child $U_{lc}$ are multicasted to both $U_i$ and $D_i$. At $D_i$, they must wait for the corresponding partial sum from $D_p$. During the wait period, they are stored in the limited capacity buffers on the embedded path between $U_{lc}$ and $D_i$. Buffers on short paths (small aggregate capacity) and at lower levels of the tree (wait period collective latency) can fill up and stall packet insertion in the network pipeline.

The embedding of the proposed dual-tree topology may employ the following rule to avoid deadlocks: for a vertex v, if the edge from left child to the up tree aggregator is embedded in a path p on the network, the down tree aggregator should not be mapped to a switch S that lies on the path p. This guarantees no cycles in the dependency graph and hence, avoids deadlocks.

Performance of the Dual Binary Tree Topology

If the maximum dilation of an edge in the embedding is constant, the worst-case latency of the proposed topology is logarithmic in the number of processes (or elements in prefix scan). However, when operating in a pipelined manner, another performance metric to optimize is the throughput achieved by the topology. This disclosure describes the performance bottlenecks in the proposed topology and recommends simple embedding mechanisms that can alleviate these bottlenecks.

When the prefix scan is working in a pipelined manner, multiple inputs are queued for processing. As shown in the in FIG. 1, the left child input to the up tree aggregator of a vertex is also forwarded to the down tree aggregator. Before it can be operated upon by the down tree aggregator, this input must wait until the corresponding partial sum is received from the parent vertex. During this period, this input is stored (e.g., buffered in a FIFO buffer).

Figure 11:
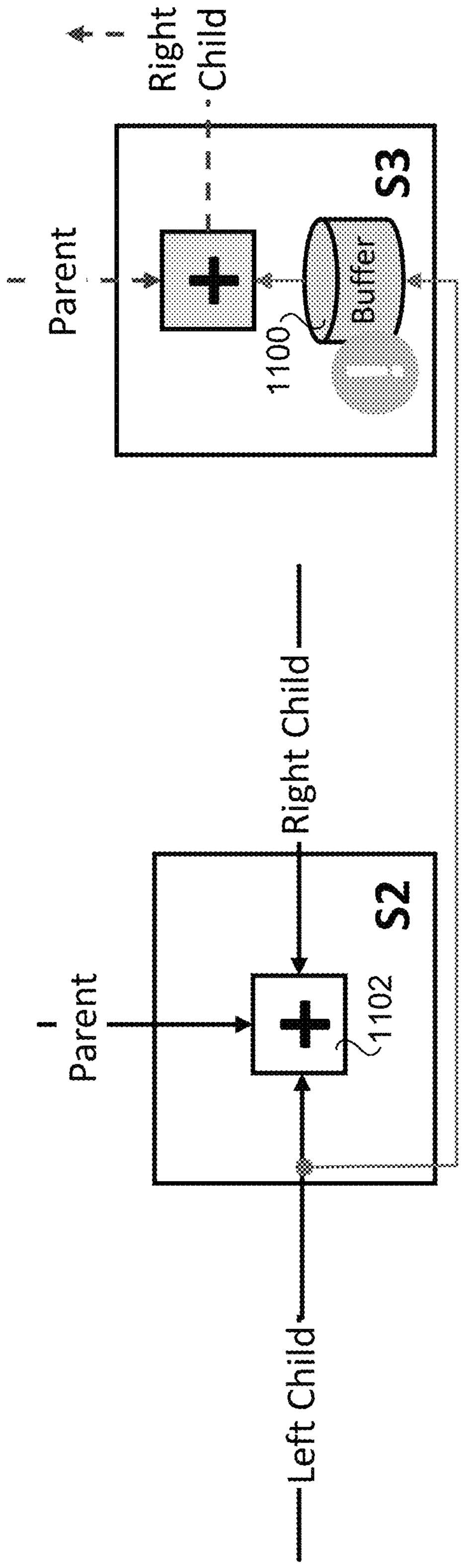
FIG. 11 is diagram illustrating an example of a buffer being filled.

Typical software-based approaches deal with such issues by storing this input value in process memory. However, in an in-network computation scenario, this may not be feasible, and the value will be stored in-flight using link buffers. Specifically, buffers of those links are used on which the edge from left child input to the down tree aggregator is embedded. When multiple input values are queued, the (limited capacity) link buffer can get full and stall the pipeline, as shown in the example embedding of FIG. 11. On switch S2, the output port that forwards left child to switch S3 stops firing when the input port buffer 1100 on switch S3 is full. Consequently, the aggregator 1102 on switch S2 also stops firing and stalls the pipeline.

When embedding the proposed topology, the dilation of these selective edges that carry partial sums from up tree to the down tree (Up tree to Down tree edges in FIG. 1) can be increased to improve pipeline throughput. This increases the effective in-flight storage capacity for storing the left child input and reduces stalling.

As an example, when embedding a vertex on a PIUMA die, the unused links can be included in the mapping to increase the dilation of this edge. As shown in FIG. 4 and discussed above, there are two bidirectional links that connect a switch to the tiles on its left or right. One of these links could be used for routing the edges in the topology and the other can be used for increasing the dilation of the desired edge by constructing a loop, as shown in FIG. 12.

Figure 12:
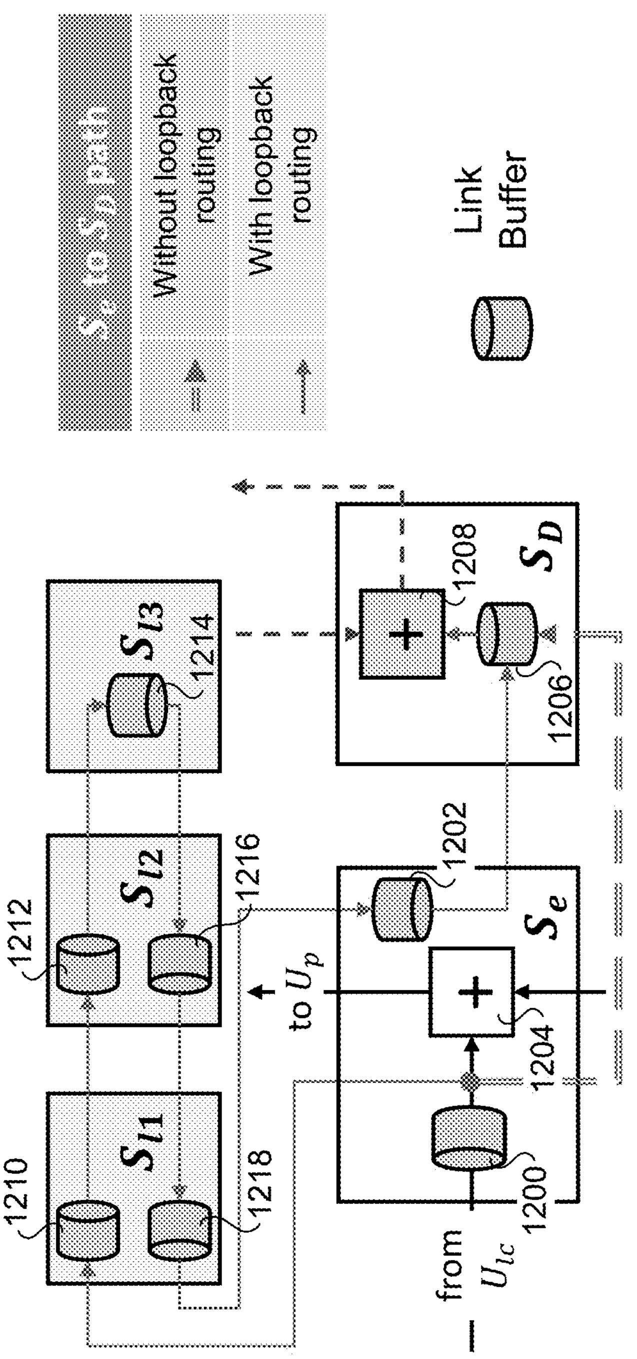
FIG. 12 is a diagram depicting a vertex embedding on a die where the edge under consideration is mapped on a loop to implement loopback routing.

The components in FIG. 12 include multiple switches labeled $S_e$, $S_D$, $S_{l1}$, $S_{l2}$, and $S_{l3}$. Switch $S_e$ includes link buffers 1200 and 1202 and an up tree aggregator 1204, while switch $S_D$ includes a link buffer 1206 and a down tree aggregator 1208. Switches $S_{l1}$, $S_{l2}$, and $S_{l3}$ include link buffers 1210, 1212, 1214, 1216, and 1218, as shown. An input (packet) from a left up tree child ($U_{lc}$) enters a socket at switch Se and is buffered in link buffer 1200. Normally, without loopback routing, the input packet would be forwarded to link buffer 1206 in switch $S_D$. With loopback routing, the input packet is routed from switch $S_e$ along a switch path comprising switches $S_{l1}$, $S_{l2}$, $S_{l3}$, $S_{l2}$, Sl1 and back to switch $S_e$ prior to being forwarded to switch $S_D$. With this loopback routing, the packet is buffered in 7 link buffers 1210, 1212, 1214, 1216, 1218, 1202 and 1206 along the route. While the placement of the aggregators is the same for both routing schemes, the effective in-flight storage for the left child input is 7× higher using the loopback route. For a large system where the latency of getting the partial sum of parent is higher than the time taken to fill all the buffers in this vertex' embedding, this can increase the throughput by 7×. Multiple loops can also be concatenated for further improvement.

Generally, a reduction operator for a prefix scan can either be pre-programmed using its configuration register, or opcodes may be included in messages sent to the reduction operator to instruct the reduction operator to perform a corresponding reduction operation. For example, a multi-bit opcode may be provided in a message that is parsed by a switch and based on the multi-bit opcode the reduction operator in the switch determines what prefix scan operation to perform.

In some embodiments, a switch or switch tile may include an Infrastructure Processing Unit (IPU) or a Data Processing Unit (DPU). Switches may also comprise hardware programmable switches using languages such as but not limited to P4 (Programming Protocol-independent Packet Processors) and NPL (Network Programming Language).

Generally, various types of point-to-point interconnects may be used for intra-socket/intra-die, inter-socket/inter-die, and interconnects between subnodes or nodes employing links and associated protocols including but not limited to: Peripheral Component Interconnect express (PCIe), Intel® QuickPath Interconnect (QPI), Intel® Ultra Path Interconnect (UPI), Intel® On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, and Cache Coherent Interconnect for Accelerators (CCIX) Ethernet (IEEE 802.3), remote direct memory access (RDMA), InfiniBand, Internet Wide Area RDMA Protocol (iWARP), quick UDP Internet Connections (QUIC), and RDMA over Converged Ethernet (RoCE).

Generally, the switches used to interconnect nodes and subnodes may include Top of Rack (ToR) switches, leaf switches, spline (backbone) switches, and other types of switches that are deployed in data centers and HPC environments. These switches may employ one or more of the links and protocols above.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (e.g., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for performing a prefix scan computation, comprising:

implementing first and second binary aggregation trees in a feed-forward network topology;

inserting input array values in leaves of the first binary aggregation tree;

performing prefix scan operations at nodes in the first and second binary aggregation trees in conjunction with routing data along edges in the first and the second binary aggregation trees to compute output values for the prefix scan; and providing the output values of the prefix scan at leaves of the second binary aggregation tree.

2. The method of claim 1, wherein the first binary aggregation tree comprises an up tree having a first plurality of the nodes and including a first plurality of leaves and a first root, wherein input values for the prefix scan are inserted as inputs at the first plurality of leaves and a first set of the prefix scan operations are performed at the first plurality of the nodes as data propagates from the first plurality of leaves toward the root of the up tree.

3. The method of claim 2, wherein the second binary aggregation tree comprises a down tree having a second plurality of the nodes and including a second plurality of leaves and a second root, wherein a second set of the prefix scan operations are performed as data is propagated from the root of the down tree toward the second plurality of leaves.

4. The method of claim 1, further comprising:

embedding the first and second binary aggregation trees in a physical network comprising a plurality of switches; and performing prefix scan aggregation calculations using collective engines in the plurality of switches.

5. The method of claim 4, further comprising:

performing collective operations using the plurality of the collective engines in the plurality of switches.

6. The method of claim 1, wherein the first and second binary aggregation trees respectively comprise an up aggregation tree including a first plurality of aggregation nodes and a down aggregation tree including a second plurality of aggregation nodes and wherein the aggregation nodes in the up aggregation tree are used to calculate partial sums that are provided as inputs to the aggregation nodes in the up aggregation tree.

7. The method of claim 6, wherein the method is implemented in a system comprising a plurality of interconnected dies or sockets, wherein the aggregation nodes in the up aggregation tree and down aggregation tree are grouped on a pair-wise basis where a pair includes an up aggregation tree node and a down aggregation tree node, and wherein processing operations for a given pair of the aggregation nodes are performed using the same die or socket.

8. The method of claim 1, wherein the prefix scan comprises an exclusive prefix scan.

9. A method for performing an in-network prefix scan computation, comprising:

embedding a dual binary tree topology in a network to compute prefix scan aggregation operations for an array of input values within the network as data packets traverse the network, the prefix scan aggregation operations being performed by collective engines in the network; and outputting an array of prefix scan output values, wherein the dual binary tree topology comprises an up tree having a first plurality of nodes and including a first plurality of leaves and a first root, wherein input values for the prefix scan are provided as inputs at the first plurality of leaves and a first set of the prefix scan operations are performed at the first plurality of nodes as data propagates from the first plurality of leaves toward the root of the up tree.

10. The method of claim 9, wherein the network comprises a plurality of switches, further comprising performing prefix scan calculations using the collective engines in the plurality of switches.

11. The method of claim 9, wherein an entirety of operations for computing the prefix scan are performed within the network.

12. The method of claim 9, wherein the dual binary tree topology further comprises a down tree having a second plurality of nodes and including a second plurality of leaves and a second root, wherein a second set of the prefix scan operations are performed as data is propagated from the root of the down tree toward the second plurality of leaves.

13. A system comprising:

a network comprising a plurality of interconnected switches having collective engines;

a plurality of cores, coupled to the network; and a memory, operatively coupled to the plurality of cores, wherein the system is configured to, insert, via a portion of the plurality of cores, an array of input values for which a prefix scan is to be performed, perform the prefix scan for the array of input values using the collective engines within the network to generate a prefix scan result; and output values in the prefix scan result to a portion of the plurality of cores, wherein a dual binary tree topology including a plurality of nodes comprising the collective engines is embedded in the network to compute prefix scan operations at the plurality of the nodes using the collective engines, wherein the dual binary tree topology comprises an up tree having a first plurality of the nodes and including a first plurality of leaves and a first root, wherein input values for the prefix scan are provided as inputs at the first plurality of leaves and a first set of the prefix scan operations are performed at the first plurality of the nodes as data propagates from the first plurality of leaves toward the root of the up tree.

14. The system of claim 13, wherein the system comprises:

a plurality of dies or sockets, including, a plurality of core tiles, a core tile including multiple cores; and a plurality of switch tiles, a switch tile including multiple switches, wherein a core is interconnected with at least one switch, and wherein at least one switch in a die or socket is interconnected with at least one switch in another die or socket.

15. The system of claim 14, wherein the plurality of dies or sockets are implemented in a node or subnode, and wherein the system comprises a plurality of nodes or subnodes.

16. The system of claim 14, wherein the switch comprises:

a plurality of input ports;

a plurality of output port; and a collective engine, configured to perform one or more prefix scan calculations on data received at an input port and output a result of the prefix scan calculation to an output port.

17. The system of claim 13, wherein the dual binary tree topology further comprises a down tree having a second plurality of the nodes and including a second plurality of leaves and a second root, wherein a second set of the prefix scan aggregation operations are performed as data is propagated from the root of the down tree toward the second plurality of leaves.

18. The system of claim 13, wherein outputting values in the prefix scan result to a portion of the plurality of cores comprises the switches directly writing the prefix scan result output values into the memory operatively coupled to the portion of the plurality of cores.

* * * * *